(12) United States Patent
Allen

(10) Patent No.: US 7,193,809 B1
(45) Date of Patent: Mar. 20, 2007

(54) METHOD OF COMPENSATING FOR MICROJOG ERROR DUE TO REPEATABLE RUN-OUT

(75) Inventor: Gregory M. Allen, Layton, UT (US)

(73) Assignee: Iomega Corporation, San Diego, CA (US)

( * ) Notice: Subject to any disclaimer, the term of this patent is extended or adjusted under 35 U.S.C. 154(b) by 0 days.

(21) Appl. No.: 11/214,549

(22) Filed: Aug. 29, 2005

(51) Int. Cl.
G11B 5/596 (2006.01)
(52) U.S. Cl. .................................. 360/77.04
(58) Field of Classification Search ...... None
See application file for complete search history.

(56) References Cited

U.S. PATENT DOCUMENTS 5,204,793 A * 4/1993 Plonczak ............... 360/97.01
5,771,131 A * 6/1998 Pirzadeh ................ 360/77.08
6,198,584 B1 * 3/2001 Codilian et al. ............ 360/48
6,657,810 B1 * 12/2003 Kupferman ............ 360/77.04
6,760,185 B1 * 7/2004 Roth et al. ............... 360/77.08

* cited by examiner

Primary Examiner—K. Wong
(74) Attorney, Agent, or Firm—Stephen C. Beuerle; Procopio Cory Hargreaves & Savitch (57) ABSTRACT

A process for continually compensating for the microjog error resulting from RRO. Typically, the 1F RRO is the most significant, but the method could be applied to the microjog error caused by RRO of other frequencies. The process continually determines an instantaneous microjog error based on the RRO and adjusts the read element target position throughout one revolution, such that the write element remains centered on its intended position.

19 Claims, 6 Drawing Sheets

METHOD OF COMPENSATING FOR MICROJOG ERROR DUE TO REPEATABLE RUN-OUT

TECHNICAL FIELD OF THE INVENTION

This invention relates in general to information storage devices and, more particularly, to information storage devices having read/write heads with spaced read and write elements.

BACKGROUND OF THE INVENTION

Most computers include a disk drive which is used for data storage. The disk drive includes a rotatable disk having a magnetic coating on at least one side thereof. A read/write head is disposed adjacent the surface, and an actuator can move the read/write head approximately radially with respect to the surface, so that the head can write data to the surface and/or read data from the surface. The surface on the disk is conceptually divided into a plurality of concentric data tracks, which can each store data.

Early disk drives included a read/write head having a single read/write element, which was used both for writing data and reading data. However, there has been a progressively increasing demand for disk drives with significantly higher storage densities, and one result is that new types of heads have come into common use, examples of which include the magneto-resistive (MR) head, and the giant magneto-resistive (GMR) head. These MR and GMR heads typically have one element for writing data and a separate element for reading data, and these read and write elements are physically spaced from each other.

As is known in the art, a head can be positioned with respect to a disk by using feedback control based on servo information read from the disk with a read element of the head. In a head with spaced read and write elements, the read element is used to position the head relative to the disk not only for reading, but also for writing. One aspect of this is that, as the head is moved relative to the disk, the orientation of the read and write elements varies with respect to the tracks on the disk, such that the write element is typically aligned with a track that is different from the track with which the read element is aligned. Consequently, in order to correctly position the write element over a selected track for the purpose of writing data to that track, the read element must be positioned at a location which is radially offset from the selected track. This radial offset is referred to as a "microjog", and has a magnitude which varies as the head moves radially with respect to the disk. Techniques have been developed for calculating microjog values, and have been generally adequate for their intended purposes, but they have not been satisfactory in all respects.

As one aspect of this, there are existing disk drives in which the disk is rotatably supported in a removable cartridge, and in which the head is movably supported in a drive unit that can removably receive the cartridge. A given drive unit must be able to work with any of several similar and interchangeable cartridges, and any given cartridge must be capable of working in any of a number of compatible drive units. The removability of the cartridge introduces a number of real-world considerations into the system, and these considerations affect the accurate calculation of a microjog value.

For example, the cartridges have manufacturing tolerances which vary from cartridge. Thus, from cartridge to cartridge, there will be some variation relative to the cartridge housing of the exact position of the axis of rotation of the disk. As another example, two different cartridges may have slightly different mechanical seatings when they are inserted into the same drive unit. In fact, a given cartridge may experience different mechanical seatings on two successive insertions into the same drive unit. Real-world variations of this type cause small variations in the orientation of the read/write head with respect to the tracks on the disk, and thus affect accurate calculation of a microjog value.

One of the major components of head position error is called repeatable runout (RRO). RRO that occurs at the disk rotating frequency may be called 1F runout. There are several possible causes for 1F runout, such as an unbalanced spindle, or a non-ideal spindle bearing.

In order to realize higher data storage densities in systems of the type which utilize removable cartridges, it is desirable to be able to use read/write heads that facilitate high storage densities, especially read/write heads that have spaced read and write elements, such as MR and GMR heads. What is needed is a system that compensates for any changes in the microjog that may occur.

Further, if a removable cartridge is dropped, the disk may slip within the clamp, resulting in large RRO. As the head moves back and forth in order for the read element to follow the RRO, the write element, which is spaced some distance away from the read element, does not remain centered over the intended write position. If the track density is high enough, the microjog error caused by the RRO will increase, eventually resulting in degraded performance in reading the data. In addition, if the RRO changes once the disk has been written, a subsequent write may cause encroachment. What is needed is a system that can compensate for microjog error caused by the RRO.

SUMMARY OF THE INVENTION

A process for continually compensating for the microjog error resulting from RRO. Typically, the 1F RRO is the most significant, but the method could be applied to the microjog error caused by RRO of other frequencies. The process continually determines an instantaneous microjog error based on the RRO and adjusts the read element target position throughout one revolution, such that the write element remains centered on its intended position.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
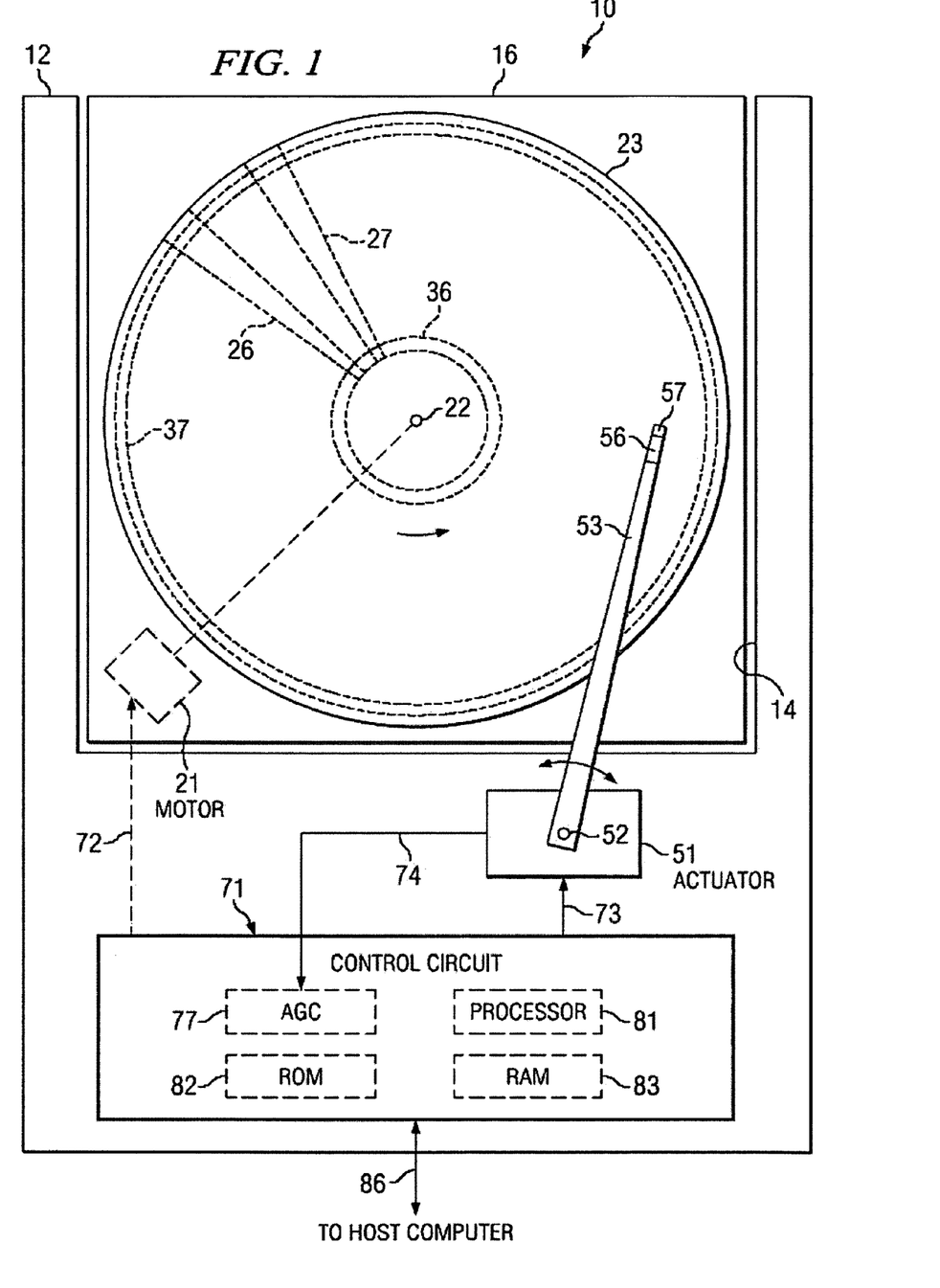
FIG. 1 is a diagrammatic view of an apparatus which is an information storage system that embodies aspects of the present invention.

FIG. 1 is a diagrammatic view of an apparatus which is an information storage system 10, and which embodies aspects of the present invention. The system 10 includes a receiving unit or drive 12 which has a recess 14, and includes a cartridge 16 which can be removably inserted into the recess 14.

The cartridge 16 has a housing, and has within the housing a motor 21 with a rotatable shaft 22. A disk 23 is clamped on the shaft 22 for rotation therewith. The side of the disk 23 which is visible in FIG. 1 is coated with a magnetic material of a known type, and serves as an information storage medium. This disk surface is conceptually divided into a plurality of concentric data tracks. In the disclosed embodiment, there are about 50,000 data tracks, not all of which are available for use in storing user data.

The disk surface is also conceptually configured to have a plurality of circumferentially spaced sectors, two of which are shown diagrammatically at 26 and 27. These sectors are sometimes referred to as servo wedges. The portions of the data tracks which fall within these sectors or servo wedges are not used to store data. Data is stored in the portions of the data tracks which are located between the servo wedges. The servo wedges are used to store servo information of a type which is known in the art. The servo information in the servo wedges conceptually defines a plurality of concentric servo tracks, which have a smaller width or pitch than the data tracks. In the disclosed embodiment, each servo track has a pitch or width that is approximately two-thirds of the pitch or width of a data track. Consequently, the disclosed disk 23 has about 73,000 servo tracks. The servo tracks effectively define the positions of the data tracks, in a manner known in the art.

Approximately 60 of the data tracks, which are the radially innermost tracks, are set aside as a first reserved area 36. Approximately 60 more data tracks, which are the radially outermost tracks, are set aside as a second reserved area 37. The reserved areas 36 and 37 are not available to store user data, but instead are used for a special purpose which is discussed later. User data is stored in the many data tracks that are disposed between the reserved areas 36 and 37 (except in the regions of the servo wedges).

The drive 12 includes an actuator 51 of a known type, such as a voice coil motor (VCM). The actuator 51 can effect limited pivotal movement of a pivot 52. An actuator arm 53 has one end fixedly secured to the pivot 52, and extends radially outwardly from the pivot 52. The housing of the cartridge 16 has an opening in one side thereof. When the cartridge 16 is removably disposed within the drive 12, the arm 53 extends through the opening in the housing, and into the interior of the cartridge 16. At the outer end of the arm 53 is a suspension 56 of a known type, which supports a read/write head 57. In the disclosed embodiment, the head 57 is a component of a known type, which is commonly referred to as a giant magneto-resistive (GMR) head. However, it could alternatively be some other type of head, such as a magneto-resistive (MR) head.

During normal operation, the head 57 is disposed adjacent the magnetic surface on the disk 23, and pivotal movement of the arm 53 causes the head 57 to move approximately radially with respect to the disk 23, within a range which includes the reserved areas 36 and 37. When the disk 23 is rotating at a normal operational speed, the rotation of the disk induces the formation between the disk surface and the head 57 of an air cushion, which is commonly known as an air bearing. Consequently, the head 57 floats on the air bearing while reading and writing information to and from the disk, without direct physical contact with the disk. However, the invention is not limited to systems in which the head is spaced from the disk by an air bearing, and can be used in systems where the head physically contacts the disk.

The drive 12 includes a control circuit 71, which is operationally coupled to the motor 21 in the cartridge 16, as shown diagrammatically at 72. The control circuit 71 selectively supplies power to the motor 21 and, when the motor 21 is receiving power, the motor 21 effects rotation of the disk 23. The control circuit 71 also provides control signals at 73 to the actuator 51, in order to control the pivotal position of the arm 53. At 74, the control circuit 71 receives an output signal from the head 57, which is commonly known as a channel signal. When the disk 23 is rotating, segments of servo information and data will alternately move past the head 57, and the channel signal at 74 will thus include alternating segments or bursts of servo information and data.

The control circuit 71 includes a channel circuit of a known type, which processes the channel signal received at 74. The channel circuit includes an automatic gain control (AGC) circuit, which is shown at 77. The AGC circuit 77 effect variation, in a known manner, of a gain factor that influences the amplitude of the channel signal 74. In particular, the AGC circuit uses a higher gain factor when the amplitude of the channel signal 74 is low, and uses a lower gain factor when the amplitude of the channel signal 74 is high. Consequently, the amplitude of the channel signal has less variation at the output of the AGC circuit 77 than at the input thereof.

The control circuit 71 also includes a processor 81 of a known type, as well as a read only memory (ROM) 82 and a random access memory (RAM) 83. The ROM 82 stores a program which is executed by the processor 81, and also stores data that does not change. The processor 81 uses the RAM 83 to store data or other information that changes dynamically during program execution.

The control circuit 71 of the drive 12 is coupled through a host interface 86 to a not-illustrated host computer. The host computer can send user data to the drive 12, which the drive 12 then stores on the disk 23 of the cartridge 16. The host computer can also request that the drive 12 read specified user data back from the disk 23, and the drive 12 then reads the specified user data and sends it to the host computer. In the disclosed embodiment, the host interface 86 conforms to an industry standard protocol which is commonly known as the Universal Serial Bus (USB) protocol, but could alternatively conform to any other suitable protocol, including but not limited to the IEEE 1394 protocol.

Figure 2:
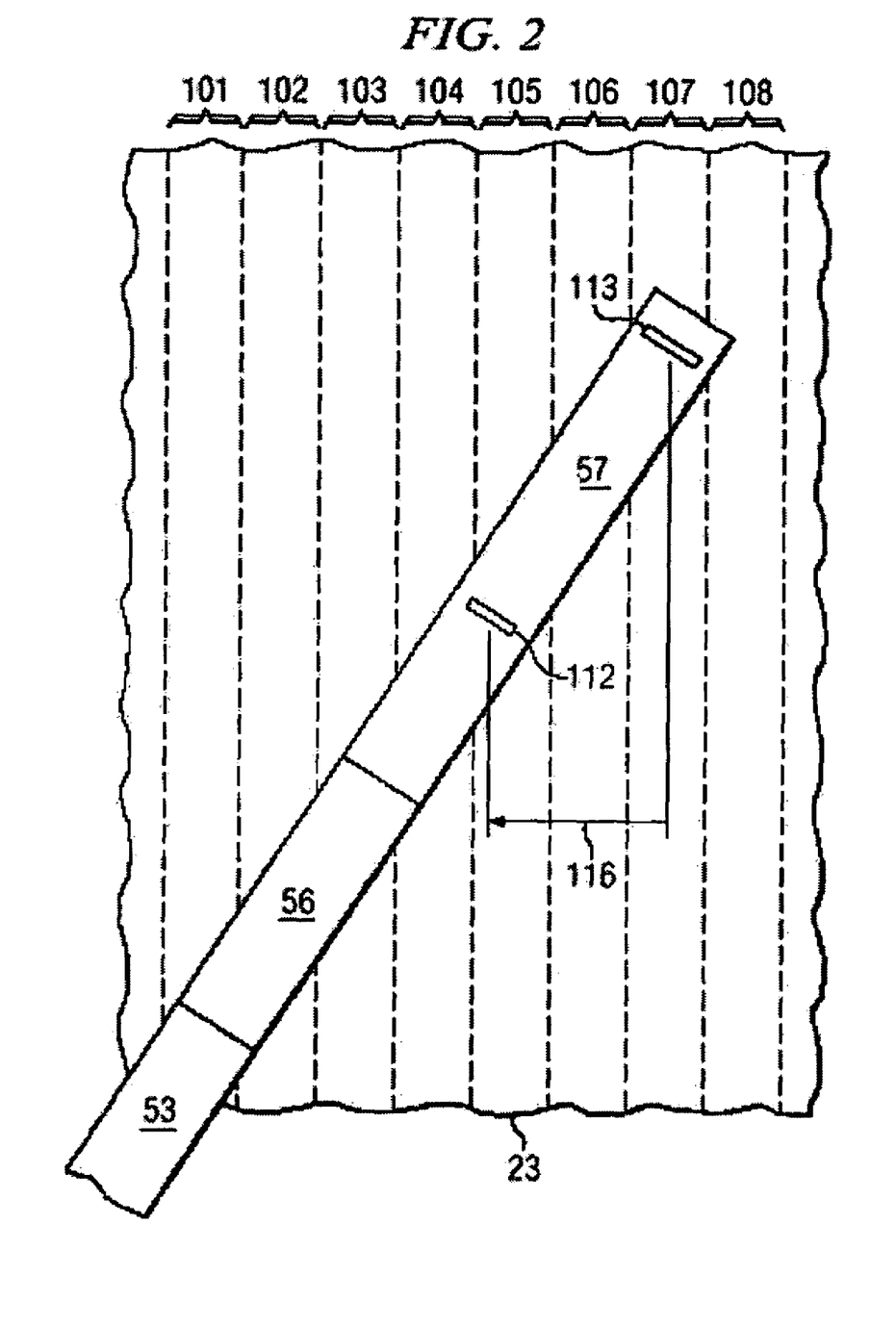
FIG. 2 is a fragmentary diagrammatic view which shows a portion of the system of FIG. 1 in a substantially enlarged scale.

FIG. 2 is a fragmentary diagrammatic view which shows, in a substantially enlarged scale, a portion of the structure of FIG. 1, including the head 57, the suspension 56, and portions of the arm 53 and disk 23. It should be understood that the depiction of all of these components is highly diagrammatic. Reference numerals 101–108 identify eight adjacent data tracks on the disk 23, which are close to but not within the reserved area 37 (FIG. 1). The tracks 101–108 are circular and concentric but, due to the degree of enlargement involved in FIG. 2, the curvature is sufficiently gradual that these tracks appear to be straight lines. The read/write head 57 has a read element 112 and a write element 113, which are shown diagrammatically, and which are spaced from each other. The write element 113 has a length which is somewhat longer than the length of the read element 112.

As the disk 23 rotates, segments of servo information and segments of data on the disk alternately move past the read element 112. The read element 112 produces the channel signal, which is supplied at 74 to the control circuit 71 (FIG. 1), and which includes alternating bursts of data and servo information. By analyzing the successive bursts of servo information received from the read element 112, the control circuit 71 can make an accurate determination of the current radial position of the read element 112. In particular, the control circuit 71 can use the servo information to accurately determine the radial position of the read element 112 with respect to the not-illustrated servo tracks. Since the positions of the data tracks are defined by the servo tracks, knowledge of the radial position of the read element 112 with respect to the servo tracks also constitutes knowledge of the radial position of the read element 112 with respect to the data tracks. Thus, in FIG. 2, the control circuit 71 knows from servo information read by the read element 112 that the read element 112 is currently disposed at a location straddling data tracks 104 and 105, with slightly more of the read element over track 105 than over track 104. Using this servo information read by the read element 112, the control circuit can affect feedback control to maintain the read element in a given radial position, or to radially reposition the read element 112.

Positioning the head 57 with respect to the disk 23 for the purpose of reading data is relatively straightforward, because the read element 112 is used both to read the data of interest and also to read the servo information which is used to position the read element 112. On the other hand, the write element 113 is used to write data to the disk 23, but does not read any information from the disk 23. Consequently, in order to write data to the disk 23, the write element 113 must be positioned indirectly, through the approach of positioning the read element 112 using the servo information which it is reading from the disk, and knowing where the write element 113 is in relation to the read element 112. A degree of complexity is introduced by the fact that the write element 113 is typically not aligned with the same data track as the read element 112. In fact, the radial position of the write element 113 in relation to the read element 112 is not a constant, but varies as the head 57 is moved radially of the disk.

In FIG. 2, for example, due to the angle of the actuator arm 53 with respect to the disk 23, the write element 113 is offset in a radial direction by approximately 2.33 data tracks from the read element 112. As explained above, there are 1.5 of the not-illustrated servo tracks for each illustrated data track, and so the offset can also be expressed as 2.33 data tracks×1.5=3.5 servo tracks. This radial offset, which is also referred to as a "microjog", is indicated diagrammatically at 116 by an arrow. Consequently, if the control circuit 71 wants to use the write element 113 to write data to the data track 107, the control circuit must use the servo information received through the read element 112 to accurately position the read element 112 so that it straddles data tracks 104 and 105 in the manner shown in FIG. 2, thereby centering the write element 113 over the data track 107 so that the write element can be used to write data to the data track 107.

Figure 3:
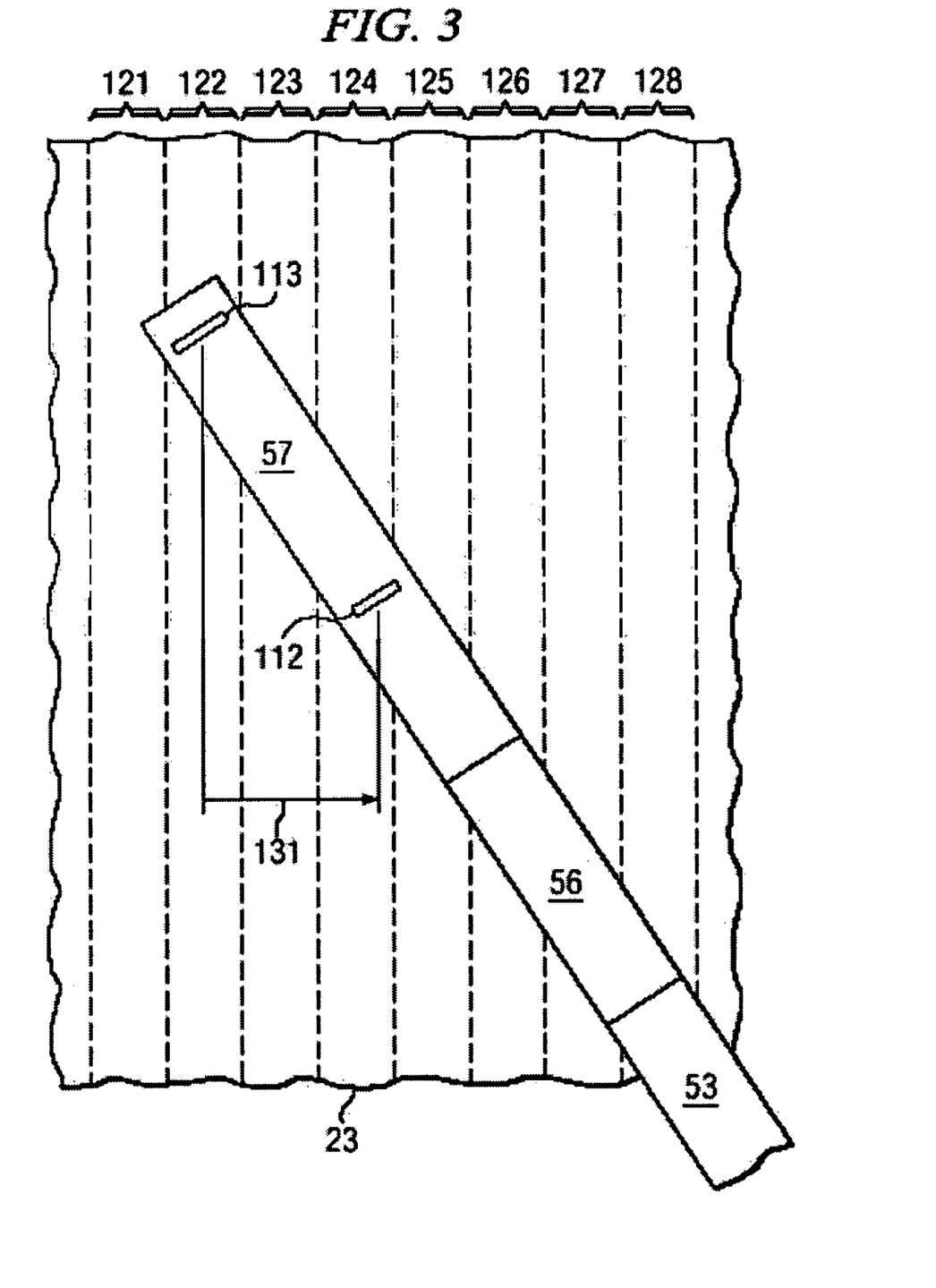
FIG. 3 is a fragmentary diagrammatic view similar to FIG. 2, but showing a different operational position.

FIG. 3 is a fragmentary diagrammatic view similar to FIG. 2, but showing a different operational position. In particular, the actuator arm 53 has been rotated counterclockwise from the position shown in FIG. 2, so that in FIG. 3 the head 57 is near but not within the reserved area 36. FIG. 3 shows eight data tracks 121–128. It will be noted that the write element 113 is centered over the data track 122, and the read element 112 straddles the data tracks 124 and 125, with slightly more of the read element over the track 124 than the track 125. Thus, when the control circuit 71 wants to use the write element 113 to write data to the track 122, it uses servo information read by the read element 112 to accurately position the read element 112 so that the read element straddles the tracks 124–125 in the manner shown in FIG. 3.

In this situation, the read element 112 is offset by approximately 2.33 data tracks (3.5 servo tracks) from the write element 113, which is the microjog indicated by the arrow 131 in FIG. 3. However, it will be noted that the radial direction of the arrow 131 in FIG. 3 is opposite to the radial direction of the arrow 116 in FIG. 2. Stated differently, in order to position the write element 113 over the track 107 in FIG. 2, the control circuit 71 must position the read element 112 so that it is disposed 2.33 data tracks (3.5 servo tracks) in a direction radially inwardly from the track 107. In contrast, in order to position the write element 113 over the track 122 in FIG. 3, the control circuit 71 must position the read element 112 so that it is disposed 2.33 data tracks (3.5 servo tracks) in a direction radially outwardly from the track 122.

Figure 4:
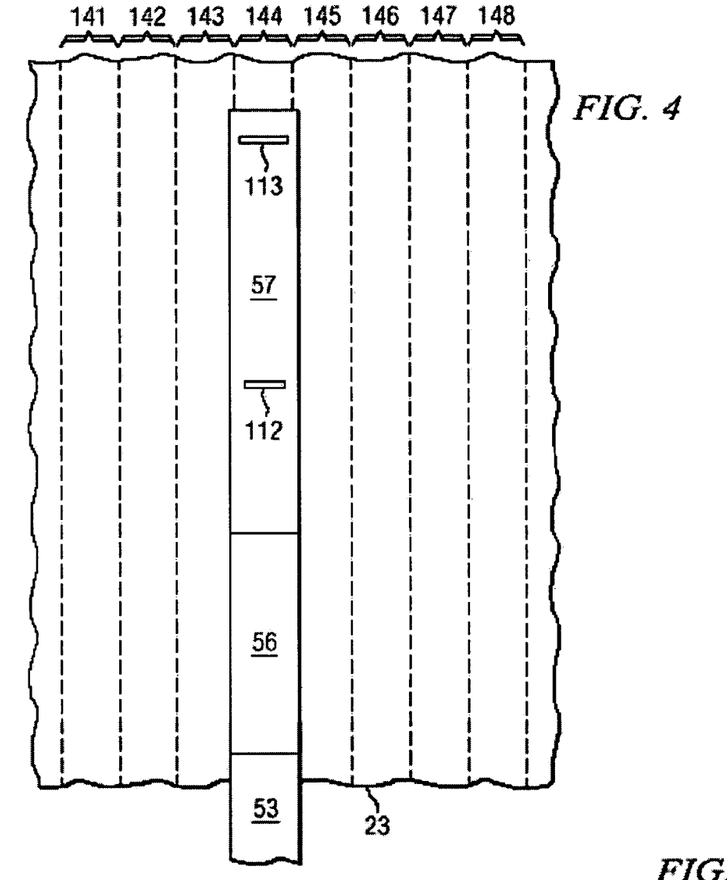
FIG. 4 is a fragmentary diagrammatic view similar to FIGS. 2 and 3, but showing still another operational position.

FIG. 4 is a fragmentary diagrammatic view similar to FIGS. 2 and 3, but showing yet another operational position. In FIG. 4, the actuator arm 53 is disposed approximately halfway between the positions shown in FIGS. 2 and 3. FIG. 4 shows eight data tracks 141–148. The read element 112 and the write element 113 are both relatively accurately centered over the same data track 144. Thus, in FIG. 4, the microjog value is zero, because the read element 112 does not need to be positioned with an offset from the track 144 in order to center the write element 113 over the track 144. Stated differently, if the read element 112 is radially centered over the track 144, the write element will also be radially centered over the track 144.

With reference to FIGS. 2–4, it will be noted that, as the actuator arm 53 is pivoted and moves the head 57 radially across the disk, the appropriate microjog value varies progressively from a positive value through zero to a negative value. This is due in part to the spacing between the read element 112 and the write element 113, and is also due in part to the fact that there is variation in the angle of the read and write elements with respect to the tracks on the disk as the head is moved radially with respect to the disk. Consequently, when the write element 113 is to be used to write data to any given data track, an appropriate microjog value must be determined for that data track in order to know where to position the read element 112 while that write operation is carried out.

As discussed above in association with FIG. 1, the cartridge 16 can be removed from the drive 12. In fact, the drive 12 is designed with the intent that any one of a number of similar cartridges can be interchangeably inserted into the drive 12, and that the drive 12 will work reliably and accurately with any of the cartridges. The removability of the cartridge 16 introduces additional considerations into the determination of an appropriate microjog value, because there will be factors that vary from cartridge to cartridge, and factors that vary from insertion to insertion. For example, there will be mechanical tolerances involved in how different cartridges seat within the recess 14 within the drive 12. In fact, if a given cartridge is disposed in the drive 12, and is then removed and reinserted, the mechanical seating may change somewhat. If that cartridge is then removed and replaced with a different cartridge, the replacement cartridge may seat differently than the original cartridge. Consequently, the exact position of the disk with respect to the head may vary from one cartridge insertion to another, for either the same or different cartridges.

Further, internal variations can exist from cartridge to cartridge. For example, due to mechanical tolerances, the physical location of the motor shaft 22 with respect to the housing of its cartridge may be slightly different in one cartridge as compared to another cartridge. These tolerance and/or seating variations can cause variation in the distance between the motor spindle 22 and the actuator pivot 52, which in turn can affect the appropriate microjog value.

A further consideration is that the servo information on the disk in one cartridge may have been written to the disk at the factory by one servo-writer machine, while the servo information on the disk in a different cartridge may have been written by a different servo-writer machine. As a result, each track on one disk may not be in precisely the same radial location as the equivalent track on another disk.

Yet another consideration is that the foregoing discussion has focused on how a particular drive must be able to accurately and reliably work with any of a number of different cartridges, but the converse is also true. In particular, a given cartridge must be able to reliably and accurately work in a number of different drives.

Still another consideration is that the spacing between and orientation of the read and write elements 112 and 113 may vary from head to head (and thus from drive to drive), for example due to process variations involved in manufacturing the head. In order to be able to use exactly the same firmware program for the processor 81 in each drive 12, without customization for each drive, the firmware must be capable of accommodating real-world variations such as variations from one read/write head to another.

Consequently, in the context of a removable cartridge, there are a variety of factors, including those discussed above, which can affect proper calculation of an accurate microjog value. One feature of the present invention relates to techniques that allow accurate determination of a microjog value, despite factors of this type. These techniques for accurately calculating microjog are explained in detail below. First, however, an overview is provided.

In particular, with reference to FIG. 1, the control circuit 71 of the drive 12 responds to insertion of a cartridge 16 by erasing data in at least part of the reserved area 36, and then positioning the write element 113 approximately over a central portion of the reserved area 36, using servo information read by the read element 112. The control circuit 71 then uses the write element 113 to write some predetermined data in the reserved area 36. The control circuit 71 then moves the head 57 radially while searching for this data with the read element 112, until the control circuit 71 determines a radial position in which the read element 112 would be radially centered over this data. Based on servo information read by the read element 112 while the data is being written, and also servo information read by the read element 112 while the same data is later being read, the control circuit 71 knows the exact radial position of the read element 112 when the data was being written, and the exact radial position of the read element 112 when the data was being read. The control circuit 71 can then take the difference between these two positions, in order to accurately determine an actual microjog value for one specific data track within the reserved area 36.

The control circuit 71 then carries out a similar sequence of operations for the other reserved area 37. This results in a very accurate determination of an actual microjog value for one specific data track within the reserved area 37. The information obtained in this manner, which includes the two actual microjog values, serves as compensation information that is specific to the particular cartridge 16 that has been inserted into the drive 12, and the particular current seating of that cartridge.

Thereafter, when the control circuit 71 needs to write data to a selected data track on the disk 23, it carries out a two-step procedure. First, it uses a predetermined translation technique, which is independent of the particular cartridge and its present seating, to determine a nominal or ideal microjog value for the selected track. Second, the control circuit 71 uses the compensation information to adjust the nominal microjog value, in order to obtain an actual microjog value which accurately takes into account the particular cartridge and its current seating, thereby permitting the write element 113 of the head 57 to be accurately positioned over the selected track. This microjog value is the calibrated microjog value. The specific manner in which this is all carried out will now be described in greater detail.

Figure 5:
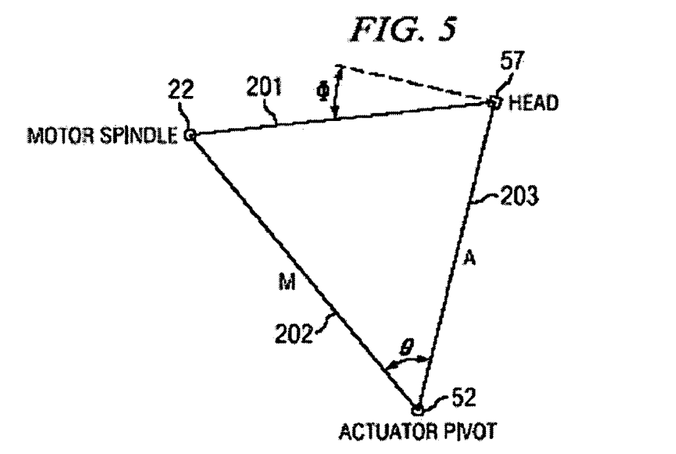
FIG. 5 is a diagrammatic view showing a geometric relationship between selected elements of the system of FIG. 1.

FIG. 5 is a diagrammatic view of selected components from the system of FIG. 1, including the motor spindle 22, the actuator pivot 52, and the head 57. Line 201 extends radially from the motor pivot 22 to the head 57. Line 202 extends radially between the motor spindle 22 and the actuator pivot 52, and has a length M. Line 203, which corresponds conceptually to the actuator arm 53, extends radially from the actuator pivot 52 to the write element 113 on the head 57, and has a length A. The angle between the lines 202 and 203 is identified by $\theta$. The angle formed by the line 201 with the read and write elements is identified by $\phi$, and can be referred to as head skew angle. It will be noted that the angles $\theta$ and $\phi$ are not constant, but vary as the arm 53 is pivoted by the actuator 51 to move the head 57 toward or away from the motor spindle 22 in FIG. 5.

Figure 6:
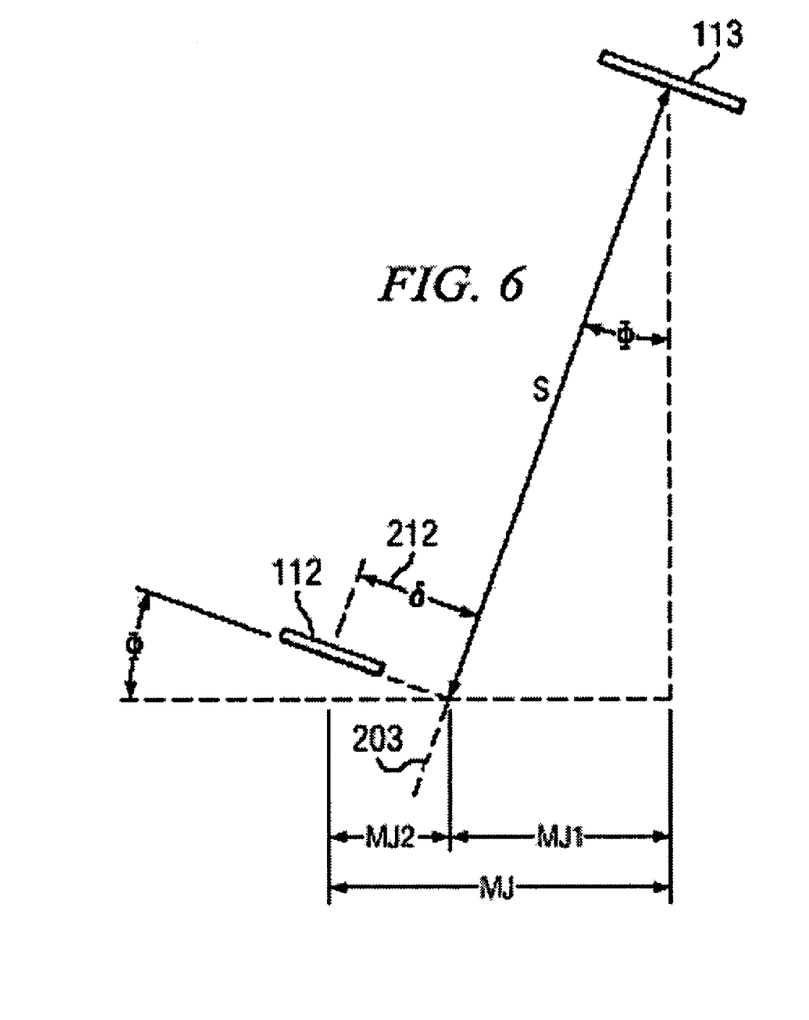
FIG. 6 is a diagrammatic view showing different geometric relationships involving other elements of the system of FIG. 1.

FIG. 6 is a diagrammatic view showing the read and write elements 112 and 113 of the head 57. As mentioned above, line 203 extends radially from the actuator pivot 52 to the write element 113, and in particular to the center of the write element 113. The distance between the read element 112 and the write element 113, in a direction parallel to the line 203, is a distance S which is identified in FIG. 6 by a double-headed arrow.

In FIG. 6, the center of the read element 112 is depicted as being laterally offset from the line 203 by a distance $\delta$, which is identified by reference numeral 212. The head 57 in the disclosed embodiment is designed so that, in theory, the read element 112 should have its center disposed on the line 203, such that $\delta=0$. However, the offset $\delta$ is depicted in FIG. 6 because, due to practical considerations such as manufacturing process variations, the read element 112 may not actually be centered accurately on the line 203. In FIG. 6, the total microjog amount is indicated at MJ, and is made up of two portions, which are respectively MJ1 and MJ2. Using standard trigonometric principles, MJ1 and MJ2 can be expressed as:

$MJ1 = S \cdot \sin(\phi)$ $MJ2 = \delta \cdot \cos(\phi)$

Consequently, the microjog amount MJ can be expressed as:

$$MJ = MJ1 + MJ2$$
$$= S \cdot \sin(\phi) + \delta \cdot \cos(\phi)$$

The microjog amount MJ can be normalized with absolute dimensions to the track pitch TP of the servo tracks, thereby yielding a microjog distance MJD in servo tracks, as follows:

$$MJD = \frac{S \cdot \sin(\phi) + \delta \cdot \cos(\phi)}{\cos(\phi) \cdot TP} \quad (1)$$
$$= \frac{S \cdot \tan(\phi) + \delta}{TP}$$

With reference to FIG. 5, it can be shown with trigonometry that:

$$\tan(\phi) = \frac{\frac{A}{M} - \cos(\theta)}{\sin(\theta)} \quad (2)$$

Inserting Equation (2) into Equation (1) yields:

$$MJD_{nom}(\text{track}) = \frac{S \cdot \left(\frac{\frac{A}{M} - \cos(\theta(\text{track}))}{\sin(\theta(\text{track}))}\right) + \delta}{TP} \quad (3)$$

Given a particular value of the angle θ, which corresponds to a particular data track and an associated servo track, Equation (3) can be used to determine the nominal or ideal microjog distance in servo tracks ($MJD_{nom}$), which is the radial offset in servo tracks that the read element 112 must have from the selected data track in order to center the write element 113 over the selected data track. Equation (3) basically represents circumstances in an ideal system that is not subject to various real-world factors of the type discussed above, such as those relating to removability. The exception is the presence in Equation (3) of δ, which in an ideal system would be zero.

A calibrated microjog distance can be determined from the nominal microjog obtained in Equation (3). The calibrated microjog is determined based on the function calc_calibrated_microjog (head, track) which calibrates the nominal microjog for the position and geometry of the head and drive. A technique for obtaining this value is disclosed in U.S. patent application Ser. No. 10/612,810, filed Jul. 2, 2003, the contents of which are hereby incorporated by reference.

Figure 7:
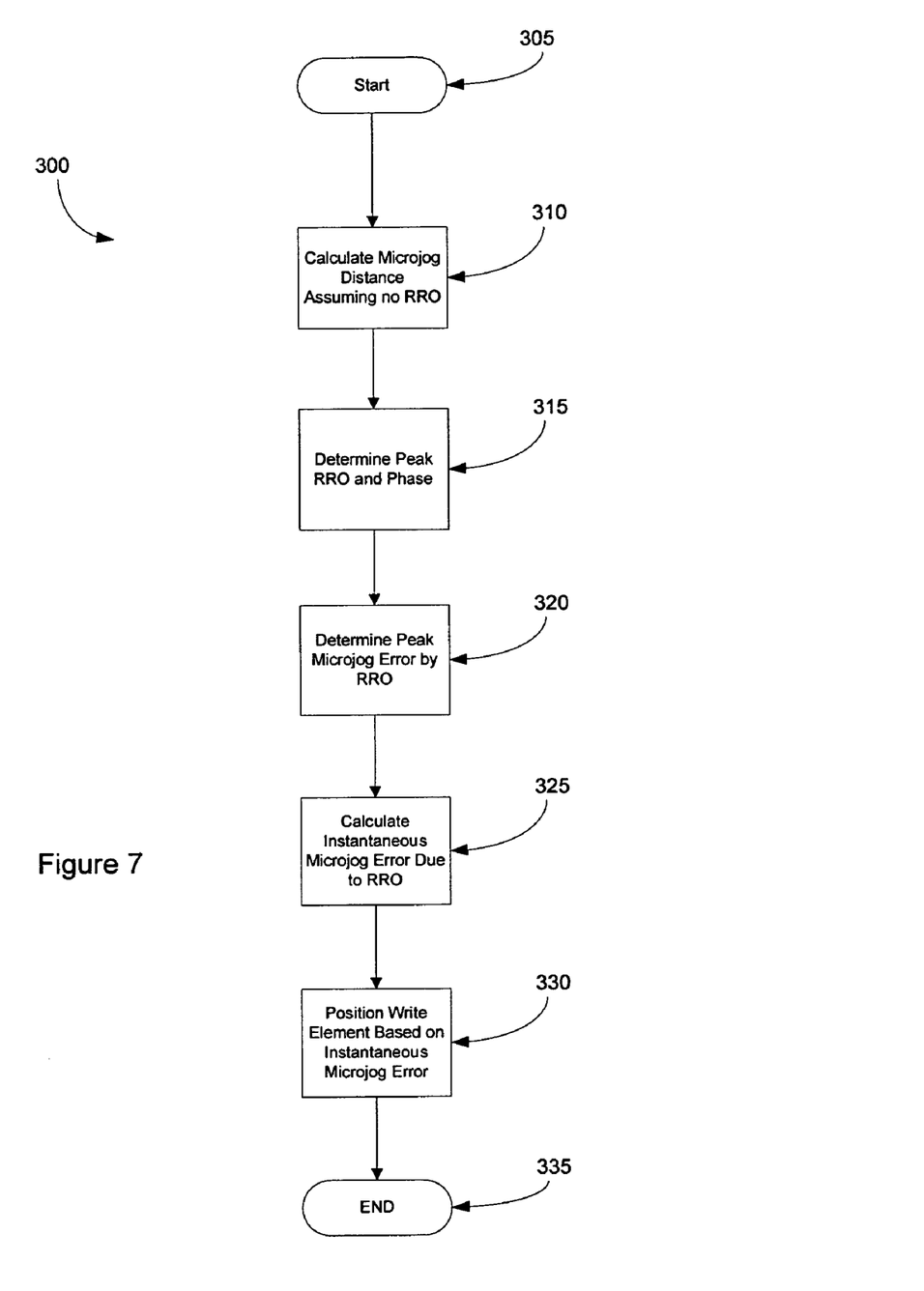
FIG. 7 is a flowchart illustrating a method of positioning the read/write head based on an instantaneous RRO-induced microjog error.

FIG. 7 is a flowchart illustrating a process 300 of positioning the read/write head based on an instantaneous RRO-induced microjog error. The process begins in START block 305. Proceeding to block 310, the process 300 calculates the microjog distance, assuming no RRO, for the intended head and write target position as described above. The microjog distance is an offset, which is summed with the write target position to determine a read target position. The read target position is the initial position of the read element, such that on average, the write element is over the write target position.

Proceeding to block 315, the process 300 obtains a measurement of the peak RRO in tracks, and its phase with respect to an index that occurs once per revolution. The RRO measurement may be obtained by analyzing sector to sector timing measurements taken during a revolution. Or the measurement could be calculated from coefficients in the RRO cancellation algorithm and the loop gain at the desired frequency. This RRO measurement may be obtained once during spin-up calibrations of the disk drive, or it may be obtained each time the head is positioned for a write. For simplicity, it is assumed that the magnitude and phase of the RRO remain constant for all tracks on the disk. In one embodiment, it may be determined that the RRO measurement is too high to safely perform data writes. In this circumstance, the write functionality may be disabled, allowing a user to access data on the disk but not write any data to the disk.

Proceeding to block 320, the process 300 calculates the microjog distance assuming the head has moved the distance of the known RRO in tracks. The difference between the microjog distance with and without RRO represents the peak microjog error caused by the RRO:

calc_calibrated_microjog(head,track+RRO)−calc_calibrated_microjog(head,track)

Note that if the RRO as measured in tracks is 0, then the peak microjog error caused by the RRO is 0.

Proceeding to block 325, the process 300 determines the instantaneous microjog error due to the RRO as the disk rotates as:

sin(w)*(calc_calibrated_microjog(head,track+RRO)−calc_calibrated_microjog(head,track))

where w refers to the angle through which the disk rotates, synchronized with the phase of the RRO previously measured.

Proceeding to block 330, the process 300 feeds the instantaneous estimate of the microjog error into the track-follow control loop, which is trying to keep the read element over the read target position defined previously. Now, the read element is no longer centered on the read target position, but it moves back and forth with the estimate of the RRO-induced microjog error. The result is that the write element remains centered on the write target position. The process 300 then terminates in END block 335.

The process 300 described up to this point applies mainly to a disk drive with a removable disk. It is important that any drive be able to write and re-write any data track on any disk. So keeping the write element centered on the write target position is critical. But in a drive with fixed media, it may be desirable to keep the read element centered on the read target position during the write. As was described previously, the write element will wander back and forth about some average position if RRO is present. When the read element is eventually used to read back the data, there may be some signal loss because the data is not always centered throughout the revolution. In a modification to the method described previously, the estimate of the RRO-induced microjog error could be introduced into the track-follow loop at the time the data is read. Thus, the read element would move in a position very close to where the write element actually wrote the data, improving the signal loss problem. However, if there is a chance that the disk could ever slip and significantly change the RRO, then it would be wise to keep the data centered during the write.

Although one embodiment has been illustrated and described in detail, it will be understood that various substitutions and alterations are possible without departing from the spirit and scope of the present invention, as defined by the following claims.

What is claimed is:

1. A disk drive comprising:
a read/write head having a read element and a write element, wherein the read element and the write element are separated by a preset distance thereby resulting in a microjog distance between the read and write elements as the read/write head is positioned at tracks of the disk;
a control circuit which positions the read/write head along a desired track of the disk, wherein the control circuit adjusts the position of the read/write head based on a repeatable runout measurement of the disk, and the control circuit further adjusts the position of the read/write head based on variations in the microjog distance resulting from adjustments based on the repeatable runout.

2. The disk drive according to claim 1, wherein the control circuit determines the repeatable runout measurement.

3. The disk drive according to claim 1, wherein the position adjustment of the read/write head centers the write element on a write target position.

4. The disk drive according to claim 1, wherein the control circuit positions the read element based on the repeatable runout measurement.

5. The disk drive according to claim 1, wherein the error due to the repeatable runout measurement is determined by the equation:

$$\sin(w)*(calc\_calibrated\_microjog(head,track+RRO)-calc\_calibrated\_microjog(head,track));$$

where w refers to the angle through which the disk rotates, synchronized with the phase of the repeatable runout.

6. The disk drive according to claim 1, further comprising a removable cartridge, wherein the cartridge contains a storage medium.

7. The disk drive according to claim 6, wherein the storage medium is a magnetic media.

8. The disk drive according to claim 6, wherein the control circuit disables write functionality when the repeatable runout measurement exceeds a predetermined threshold.

9. A method of compensating for microjog error due to repeatable runout comprising:
determining a nominal microjog distance based on a location of a read/write head relative to a disk;
obtaining a repeatable runout measurement of the disk;
calculating an instantaneous microjog error due to the repeatable runout; and
adjusting the nominal microjog distance in accordance with the instantaneous microjog error.

10. The method according to claim 9, further comprising applying the instantaneous microjog error to position a write element.

11. The method according to claim 10, further comprising centering the write element on a write target position.

12. The method according to claim 9, further comprising calculating the instantaneous microjog error using the formula:

$$\sin(w)*(calc\_calibrated\_microjog(head,track+RRO)-calc\_calibrated\_microjog(head,track))$$

where w refers to the angle through which the disk rotates, synchronized with the phase of the repeatable runout.

13. The method according to claim 9, further comprising obtaining a new repeatable runout measurement upon insertion of a removable cartridge.

14. The method according to claim 13, wherein the removable cartridge contains storage media.

15. The method according to claim 9, further comprising disabling write functionality when the repeatable runout measurement exceeds a predetermined threshold.

16. A method of positioning a read/write head in a disk drive, the method comprising:
positioning a read/write head along a desired track of the disk, the read/write head having a read element and a write element, wherein the read element and the write element are separated by a preset distance thereby resulting in a microjog distance between the read and write elements as the read/write head is position at tracks of the disk;
varying the position of the read/write head based on a repeatable runout measurement of the disk; and
adjusting the position of the read/write head based on variations in the microjog distance resulting from varying the position of the read/write head based on the repeatable runout.

17. A disk drive comprising:
a read/write head having a read element and a write element, wherein the read element and the write element are separated by a preset distance;
a control circuit which positions the read element centered on a read target position while writing data with the write element to a write track, then when reading the data written to the write tack, the controller positions the read element to a nominal write track position and further adjusts the position of the read element about the nominal write track position based on microjog variations resulting from adjustments based on instantaneous repeatable runout measurements.

18. The disk drive according to claim 17, further comprising a removable cartridge, wherein the cartridge contains a storage medium.

19. The disk drive according to claim 17, further comprising a fixed storage medium.

* * * * *